(12) United States Patent
Wakayanagi et al.

(10) Patent No.: US 9,212,913 B2
(45) Date of Patent: Dec. 15, 2015

(54) NAVIGATION APPARATUS AND MOBILE DATA TERMINAL

(75) Inventors: Haruhiko Wakayanagi, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 115 days.

(21) Appl. No.: 13/704,058

(22) PCT Filed: Oct. 5, 2010

(86) PCT No.: PCT/JP2010/005963
§ 371 (c)(1),
(2), (4) Date: Dec. 13, 2012

(87) PCT Pub. No.: WO2012/046268
PCT Pub. Date: Apr. 12, 2012

(65) Prior Publication Data
US 2013/0090845 A1    Apr. 11, 2013

(51) Int. Cl.
*G06F 3/14*  (2006.01)
*G01C 21/00* (2006.01)
*G01C 21/36* (2006.01)
*G09G 5/00*  (2006.01)

(52) U.S. Cl.
CPC .............. *G01C 21/00* (2013.01); *G01C 21/367* (2013.01); *G01C 21/3688* (2013.01); *G06F 3/14* (2013.01); *G09G 5/003* (2013.01); *G06F 3/1454* (2013.01)

(58) Field of Classification Search
CPC ......... G06F 3/14; G06F 3/1454; G01C 21/00; G01C 21/3688; G01C 21/367; G09G 5/003
See application file for complete search history.

(56) References Cited

U.S. PATENT DOCUMENTS

2005/0143914 A1* 6/2005 Yamada et al. ............... 701/211
2009/0075697 A1* 3/2009 Wilson et al. ................. 455/557
2012/0050331 A1* 3/2012 Kanda .......................... 345/649

FOREIGN PATENT DOCUMENTS

| JP | 2003-57039 A | 2/2003 |
| JP | 2005-201802 A | 7/2005 |
| JP | 2005-284886 A | 10/2005 |
| JP | 2006-3664 A | 1/2006 |
| JP | 2006-275931 A | 10/2006 |
| JP | 2008-275544 A | 11/2008 |
| JP | 2008-304465 A | 12/2008 |
| JP | 4228561 B2 | 12/2008 |

* cited by examiner

*Primary Examiner* — John Q Nguyen
*Assistant Examiner* — Michael Kerrigan
(74) *Attorney, Agent, or Firm* — Birch, Stewart, Kolasch & Birch, LLP

(57) ABSTRACT

A navigation apparatus displays map display contents of a mobile phone terminal 2 on a liquid crystal monitor 14 of an onboard information system 1 in the same direction as the direction of map display of the mobile phone terminal 2 in accordance with information about the map display acquired from the mobile phone terminal 2 via a short-range radio communication unit 9.

18 Claims, 12 Drawing Sheets

NAVIGATION APPARATUS AND MOBILE DATA TERMINAL

TECHNICAL FIELD

The present invention relates to a navigation system in which a mobile data terminal, which downloads map data a server manages and executes map display, cooperates with a navigation apparatus, which has a display screen larger than that of the mobile data terminal, to execute navigation processing.

BACKGROUND ART

As for map data used by map display application software for a mobile phone, its capacity is compact, and a mobile phone downloads its surrounding map data from a server managing the map data and executes map display. In addition, since the server updates the map data for a mobile phone, it usually updates the map data to information newer than a common onboard navigation apparatus which uses the map data stored in a storage medium such as a DVD or HDD that stores the map data about a map or POI (Point Of Interest) information.

However, since the mobile phone has a smaller display, it has a disadvantage that when scrolling its map, it cannot provide a broad view of positional relationships between its own position and a scrolled spot. Furthermore, when altering a scale of a map or scrolling it, since the mobile phone downloads the map from the server, it takes a longtime to display the map, offering a problem of being not easy for a user to use.

On the other hand, as for the onboard navigation apparatus installed in a vehicle, since it can use sensor information on the vehicle side, it has higher position accuracy. Furthermore, since the onboard navigation apparatus has a much larger display screen than the mobile phone, and can use a higher performance arithmetic unit for the display processing and use the map data stored in a storage unit readable from the apparatus, it has higher scrolling speed of the map and can enable the user to learn the positional relationships between its own position and the scrolled spot more easily.

Accordingly, as a system combining the advantages of the two devices described above, a navigation apparatus has been proposed recently which applies the map display application software for the mobile phone to the onboard information system that has car navigation functions and is mounted on the vehicle.

For example, a Patent Document 1 discloses an information transfer apparatus in which a mobile data terminal such as a mobile phone with a small-sized display screen acquires position information such as GPS (Global Positioning System) information, traffic information and destination information from the onboard information system, and executes navigation processing. The apparatus implements the navigation functions of the mobile phone, which are easy to use for a user, by exchanging the position information and POI information between the mobile phone and the vehicle side.

In addition, a Patent Document 2 discloses a system in which a mobile phone records position data (POI information) received from a car navigation system and phone numbers corresponding to it in a telephone directory as telephone directory information, and retrieves, when receiving the position data from the car navigation system, the telephone directory information by matching the received position data with the position data corresponding to the phone number.

Thus, by recording the position data in association with the telephone directory information such as a phone number and name which is used for a telephone originally, the system can directly set the position data in accordance with the phone number and name or the like. In addition, it can retrieve a phone number and name by matching the position data received from the navigation system with the position data recorded in the telephone directory information in advance.

Furthermore, a navigation apparatus disclosed in a Patent Document 3 makes it easier, in a navigation apparatus such as a PND (Portable Navigation Device) having a display with a small display screen, to understand positional relationships between the position of the vehicle and a destination by connecting a reference point (the position of the vehicle, for example) on the map display with a scrolled position or the destination by a line segment to make their positional relationships clearer.

PRIOR ART DOCUMENT

Patent Document

Patent Document 1: Japanese Patent Laid-Open No. 2008-275544.
Patent Document 2: Japanese Patent No. 4228561.
Patent Document 3: Japanese Patent Laid-Open No. 2008-304465.

DISCLOSURE OF THE INVENTION

The conventional techniques typified by the foregoing Patent Documents 1-3 have a problem in that unless the user recognizes the relationships between the map displayed on the onboard apparatus and the map displayed on the mobile phone, the ease of use of the processing such as a destination setting and the present position confirmation using the map display is impaired.

For example, every time the maps are displayed, it is necessary to execute matching of the orientation of the maps, scales and the display center positions on the maps between the onboard system and the mobile phone.

The present invention is implemented to solve the foregoing problems. Therefore it is an object of the present invention to provide a navigation apparatus and a mobile data terminal that can realize a navigation system capable of improving the visibility and operability in map display processing, insetting a destination and confirming the present position on a map, and in scrolling the map.

A mobile data terminal in accordance with the present invention comprises: a communication unit for communicating with a navigation apparatus that stores a navigation apparatus map database and with a mobile terminal application server that stores a mobile terminal map database; a display unit for executing map display; and a map display control unit for controlling the display unit so as to display map display contents of the navigation apparatus in a same direction as a direction of map display on the navigation apparatus using map data downloaded from the mobile terminal application server in accordance with information about the map display acquired from the navigation apparatus via the communication unit.

According to the present invention, it offers an advantage of being able to improve the visibility and operability in the map display processing, and in setting the destination and in checking the present position on the map.

BEST MODE FOR CARRYING OUT THE INVENTION

The best mode for carrying out the invention will now be described with reference to the accompanying drawings to explain the present invention in more detail.

Embodiment 1

Figure 1:
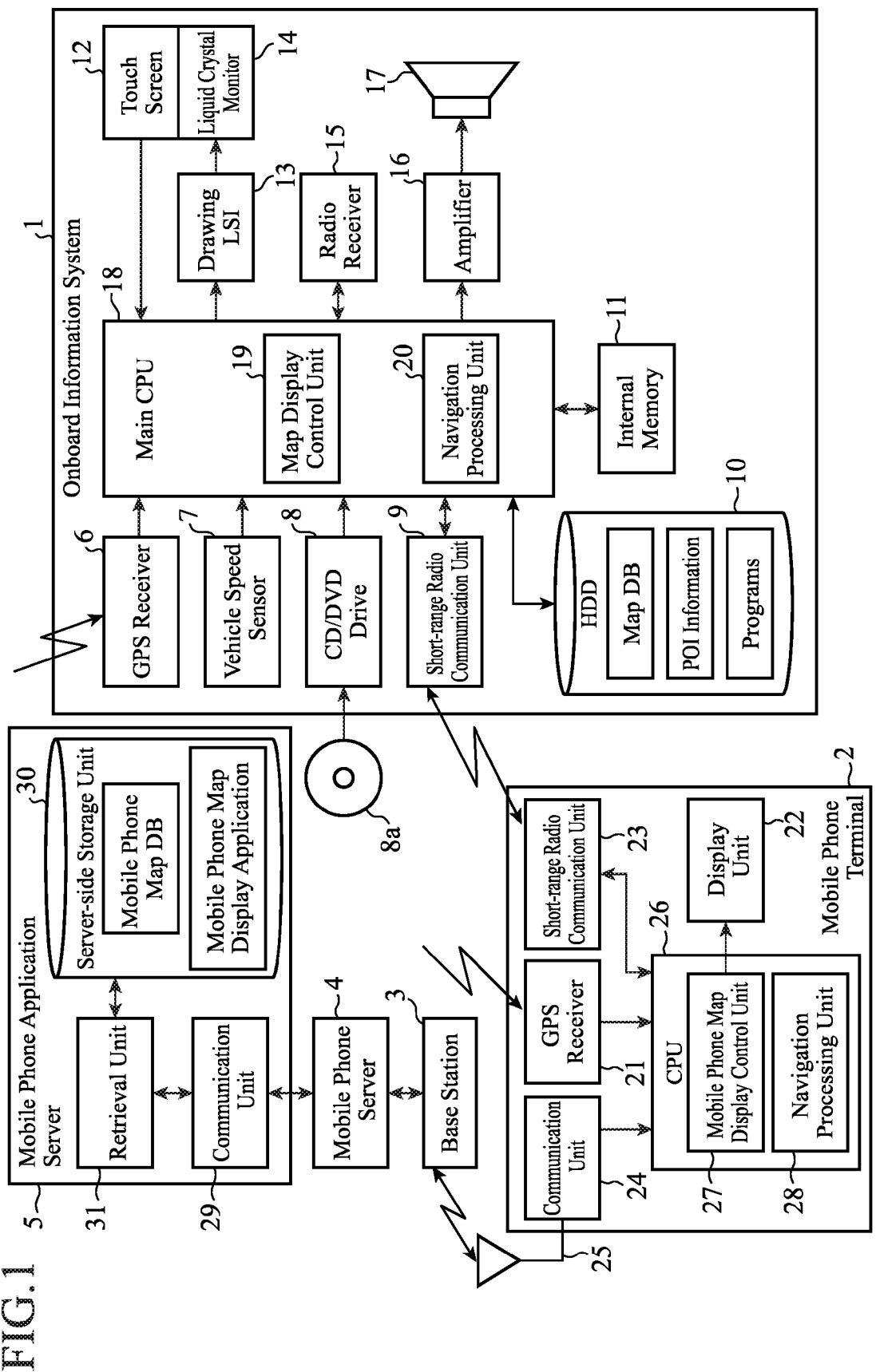
FIG. 1 is a block diagram showing a configuration of a navigation system of the embodiment 1 in accordance with the present invention.

FIG. 1 is a block diagram showing a configuration of the navigation system of an embodiment 1 in accordance with the present invention. In FIG. 1, the navigation system of the embodiment 1 comprises an onboard information system 1 corresponding to a navigation apparatus in accordance with the present invention and a mobile phone terminal 2 corresponding to a mobile data terminal in accordance with the present invention. The mobile phone terminal 2 can gain access to a plurality of application sites provided by a mobile phone server 4 through communication with the mobile phone server 4 via a base station 3. A mobile phone application server 5 is a server that manages a map display application for the mobile phone among the application sites provided by the mobile phone server 4.

The onboard information system 1, which is an onboard system that cooperates with the mobile phone terminal 2 to execute the navigation processing, comprises a GPS receiver 6, a vehicle speed sensor 7, a CD/DVD drive 8, a short-range radio communication unit 9, an HDD 10, an internal memory 11, a touch screen 12, a drawing LSI 13, a liquid crystal monitor 14, a radio receiver 15, an amplifier 16, a speaker 17, and a main CPU 18.

The GPS receiver 6 is a receiver for receiving position information on the vehicle from GPS satellites, and the vehicle speed sensor 7 is a sensor for detecting vehicle speed pulses for calculating the vehicle speed of the vehicle. The CD/DVD drive 8 reproduces an AV source stored in a storage media 8a such as a CD or DVD. The short-range radio communication unit 9, which is a component for executing short-range radio communication with the mobile phone terminal 2, is realized by communication equipment that carries out Bluetooth (registered trademark: reference to which will be omitted from now on) communication. Incidentally, as for the communication between the onboard information system 1 and the mobile phone terminal 2, a wired or wireless LAN (Local Area Network) can be used besides the Bluetooth communication. In addition, infrared communication, WiFi communication or USB is also applicable.

The HDD (hard disk drive) 10, which is a large capacity storage unit installed in the onboard information system 1, stores a map database (abbreviated to map DB from now on), POI information and programs. The map DB is a database that records map data used in the navigation processing. The POI information is information that describes the location of the POI on the map and detailed information associated with it. The programs stored in the HDD 10 are application programs for the onboard information processing the main CPU 18 executes. For example, there is an application program for navigation that executes the map display.

The internal memory 11 is a memory that serves as a work area when the main CPU 18 executes the application program for the onboard information processing.

The touch screen 12, which is provided on the display screen of the liquid crystal monitor 14, accepts an operation of a software key displayed on the display screen, screen scrolling and the like. The drawing LSI 13 is a circuit for executing map display onto the display screen of the liquid crystal monitor 14 in accordance with the instruction from the main CPU 18. The radio receiver 15, which is a receiver for receiving a radio broadcast, is tuned in accordance with an operation of a tuning button not shown. In addition, an audio signal from the main CPU 18 is amplified by the amplifier 16 and is produced as an audio output via the speaker 17. As the audio signal, there are sounds reproduced by the CD/DVD drive 8, sounds of a radio broadcast received by the radio receiver 15, and information speech about a route in the navigation processing.

The main CPU 18 is a CPU for controlling the components in the onboard information system 1. The main CPU 18 executes the application programs for the onboard information processing stored in the HDD 10 so that it carries out functions as a map display control unit 19 and a navigation processing unit 20. The map display control unit 19, which is a component for controlling the map display using the map data of the map DB stored in the HDD 10, executes the map display onto the display screen of the liquid crystal monitor 14 by controlling the drawing LSI 13. The map display control unit 19 controls the drawing LSI 13 so as to execute the map display in cooperation with the mobile phone terminal 2 based on the information received from the mobile phone terminal 2 as will be described later with reference to FIG. 2 and FIG. 3. The navigation processing unit 20 is a component for executing the navigation processing of the vehicle by using the position information on the vehicle obtained with the GPS receiver 6 and the map data of the map DB stored in the HDD 10.

The mobile phone terminal 2, which is a mobile data terminal that executes the navigation processing in cooperation with the onboard information system 1, comprises a GPS receiver 21, a display unit 22, a short-range radio communication unit 23, a communication unit 24, an antenna 25, and a CPU 26. The GPS receiver 21 is a receiver for receiving the position information of the mobile phone terminal 2 from GPS satellites. The display unit 22 displays various menu screens and executes map display in the mobile phone map display application.

The short-range radio communication unit 23, which is a component for making short-range radio communication with the onboard information system 1, is realized using a communication module that performs Bluetooth communication, for example. Incidentally, as for the communication between the onboard information system 1 and the mobile phone terminal 2, a wired or wireless LAN (Local Area Network) can be used besides the Bluetooth communication.

The communication unit 24 is a component for executing telephone communication with another mobile phone terminal on the mobile phone network through communication with the base station 3 via the antenna 25, and for executing data communication by establishing a communication connection with a mobile phone server 4.

The CPU 26, which is a CPU for controlling the components in the mobile phone terminal 2, executes the mobile phone map display application program downloaded from the mobile phone application server 5 so that it carries out functions as a mobile phone map display control unit 27 and a navigation processing unit 28. The mobile phone map display control unit 27, which is a component for controlling the map display using the foregoing map data of the mobile phone, executes the map display onto the display screen by controlling the display unit 22. The mobile phone map display control unit 27 controls the map display in cooperation with the onboard information system 1 by transmitting the information about the map display of its own terminal 2 to the onboard information system 1 as will be described later with reference to FIG. 2 and FIG. 3. The navigation processing unit 28 is a component for executing the navigation processing by using the position information of the terminal 2 obtained with the GPS receiver 21 and the map data for the mobile phone.

The mobile phone application server 5 comprises a communication unit 29, a server-side storage unit 30 and a retrieval unit 31. The communication unit 29 is a component for executing communication with the mobile phone terminal 2 via the mobile phone server 4. The server-side storage unit 30 is a storage that stores a mobile phone map display application program executed by the mobile phone terminal 2 and the map database of a mobile phone (abbreviated to "mobile phone map DB" from now on). The retrieval unit 31 is a component that searches the server-side storage unit 30 in response to a request from the mobile phone terminal 2, and that transmits the map data or application obtained as a result of the search in response to the request to the mobile phone terminal 2 via the communication unit 29 as a reply.

Next, an outline of the map display in the embodiment 1 which is executed by cooperation of the onboard information system 1 with the mobile phone terminal 2 will be described.

Figure 2:
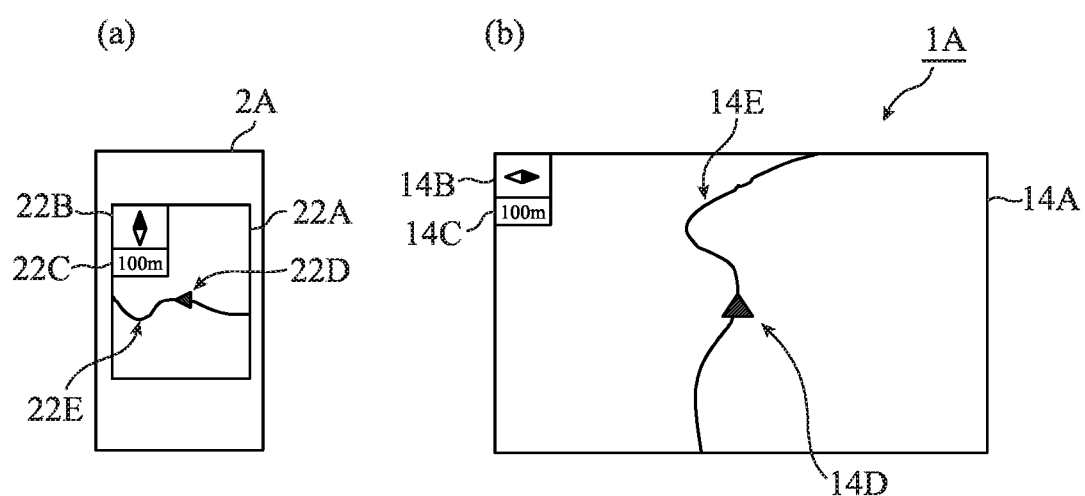
FIG. 2 is a diagram showing a map display screen of a mobile phone terminal and that of an onboard information system in a conventional navigation system.

FIG. 2 is a diagram showing a map display screen of a mobile phone terminal and that of an onboard information system in a conventional navigation system: FIG. 2(*a*) shows a map display of a conventional mobile phone terminal 2A; and FIG. 2(*b*) shows a map display of a conventional onboard information system 1A. Incidentally, FIG. 2 shows a navigation system which executes the navigation processing by the cooperation of the onboard information system 1A with the mobile phone terminal 2A by applying the conventional technique typified by the Patent Document 1. Here it is assumed that the mobile phone terminal 2A is brought into a vehicle with the onboard information system 1A installed therein. Accordingly, the direction of movement of the mobile phone terminal 2A is the same as that of the vehicle in which the onboard information system 1A is installed.

In the example shown in FIG. 2(*a*), the display screen 22A of the mobile phone terminal 2A shows a direction indicating section 22B, a scale indicating section 22C, a symbol 22D indicating the present position, and a route 22E, in which the north is the direction toward the top of the map display (north up). In addition, in the example shown in FIG. 2(*b*), the display screen 14A of the onboard information system 1A shows a direction indicating section 14B, a scale indicating section 14C, a symbol 14D indicating the present position of the vehicle, and a route 14E, in which the direction of movement of the vehicle faces the top of the map display (heading up).

Conventionally, although the onboard information system 1A and the mobile phone terminal 2A exchange the POI information and the like to execute the navigation processing, they operate independently and do not cooperate with each other as to the map display. Accordingly, a case can occur where the onboard information system 1A and the mobile phone terminal 2A have different directions in the map display as shown in FIG. 2(*a*) and FIG. 2(*b*).

In this case, a user will feel it difficult to visually perceive the relationships between the map displays of the onboard information system 1A and mobile phone terminal 2A. For example, even if the onboard information system 1A and the mobile phone terminal 2A execute the map display of the same area, if the directions of map displays differ, it is not easy for the user to grasp which position on the display screen 22A of the mobile phone terminal 2A corresponds to which position on the display screen 14A of the onboard information system 1A. Besides, in addition to the direction of the map display, if the present position and the direction of movement of the vehicle differ between the onboard information system 1A and the mobile phone terminal 2A, it becomes more difficult to visually perceive the relationships between the two map displays, which impairs the ease of the user.

Figure 3:
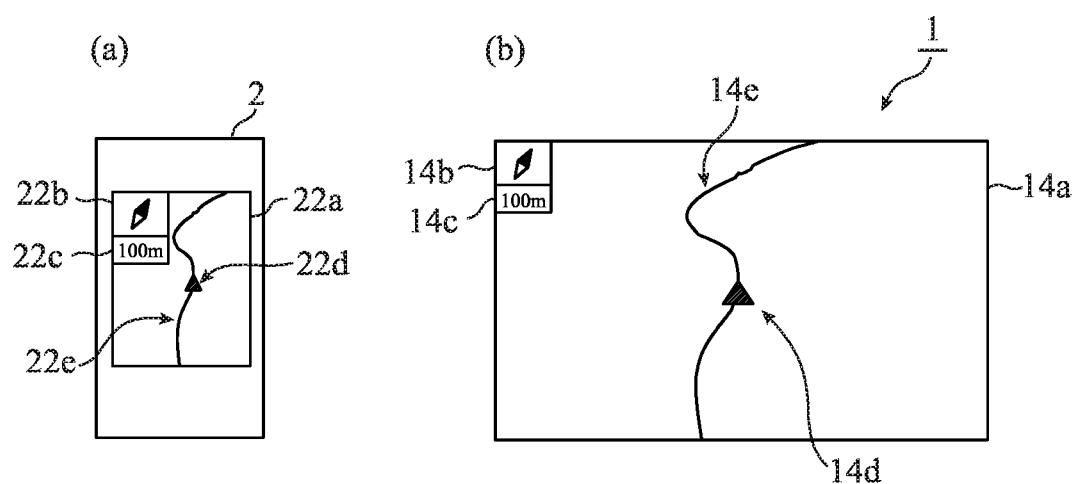
FIG. 3 is a diagram showing a map display screen of a mobile phone terminal and that of an onboard information system in the navigation system of the embodiment 1.

FIG. 3 is a diagram showing the map display screen of the mobile phone terminal and that of the onboard information system in the navigation system of the embodiment 1: FIG. 3(*a*) shows a map display of the mobile phone terminal 2 of the embodiment 1; and FIG. 3(*b*) shows a map display of the onboard information system 1 of the embodiment 1. Incidentally, it is assumed that the mobile phone terminal 2 is brought into the vehicle with the onboard information system 1 installed therein. Accordingly, the direction of movement of the mobile phone terminal 2 is the same as that of the vehicle in which the onboard information system 1 is installed. Thus, the direction of movement of the mobile phone terminal 2 shown on its display is the same as that of the vehicle shown on the display of the onboard information system 1.

In the example shown in FIG. 3(*a*), the display screen 22*a* of the mobile phone terminal 2 shows as in the conventional example a direction indicating section 22*b*, a scale indicating section 22*c*, a symbol 22*d* indicating the present position, and a route 22*e*, in which the direction of movement of the terminal 2 (the direction of movement of the vehicle) faces the top of the map display (heading up). In addition, in the example shown in FIG. 3(*b*), the display screen 14*a* of the onboard information system 1 shows a direction indicating section 14b, a scale indicating section 14c, a symbol 14d indicating the present position of the vehicle, and a route 14e, in which the direction of map display is heading up in cooperation with the mobile phone terminal 2.

In the embodiment 1, to solve the conventional problem described in FIG. 2, the onboard information system 1 and the mobile phone terminal 2 synchronize the setting of the map displays. More specifically, the mobile phone terminal 2 transmits information about the map display such as information on the direction of the map display and on the present position and the direction of movement of the terminal 2 to the onboard information system 1 via the short-range radio communication, and the onboard information system 1 executes the map display in the same direction of the map display, the present position and the direction of movement as those of the mobile phone terminal 2 according to the foregoing information. This makes it possible for the user to visually perceive the relationships easily between the map displays of both the onboard information system 1 and mobile phone terminal 2.

Next, the operation will be described.

Figure 4:
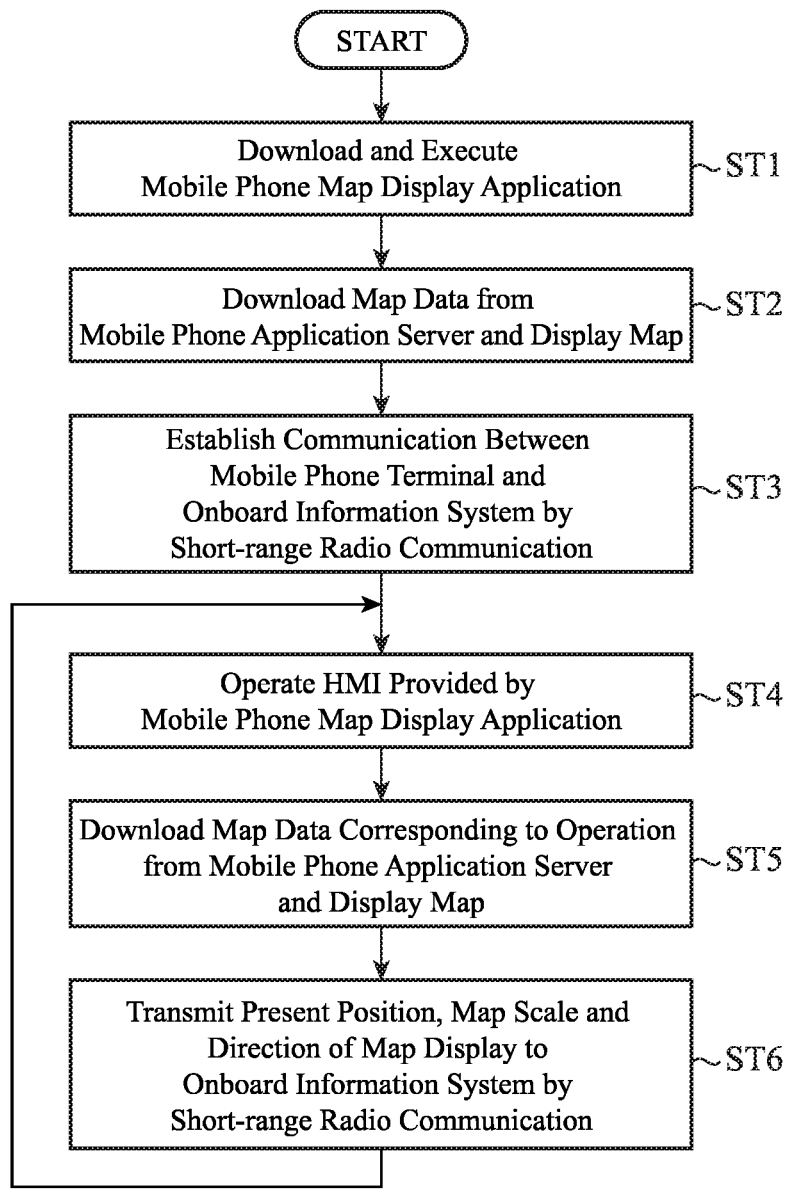
FIG. 4 is a flowchart showing a flow of the map display processing in the mobile phone terminal of the embodiment 1.
Figure 5:
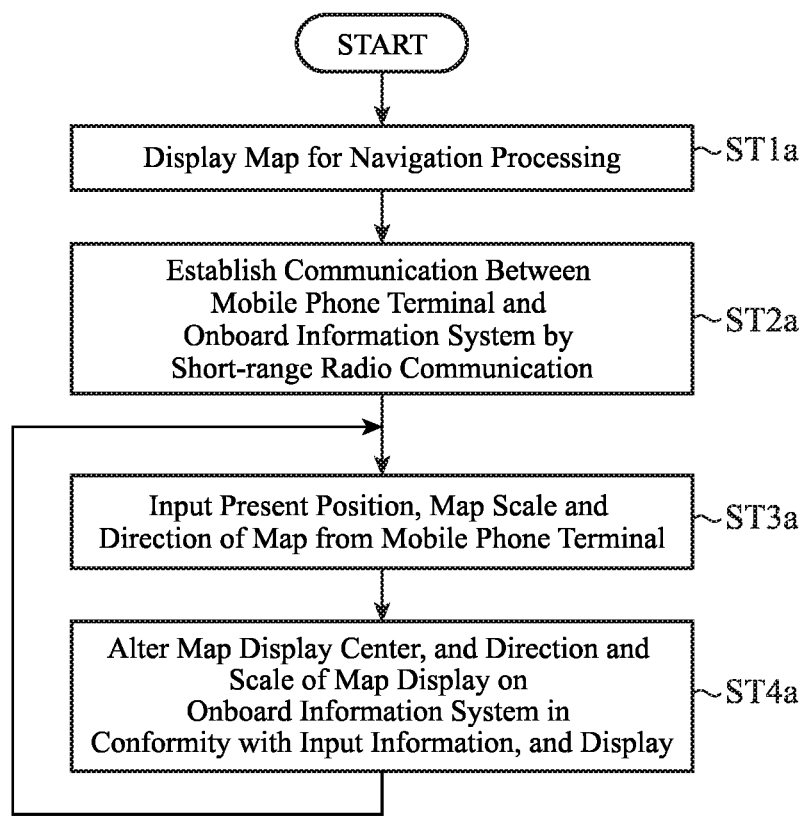
FIG. 5 is a flowchart showing a flow of the map display processing in the onboard information system of the embodiment 1.

FIG. 4 is a flowchart showing a flow of the map display processing of the mobile phone terminal of the embodiment 1, and FIG. 5 is a flowchart showing a flow of the map display processing of the onboard information system of the embodiment 1.

First, in FIG. 4, the CPU 26 of the mobile phone terminal 2 establishes a communication connection with the mobile phone application server 5 via the communication unit 24 in accordance with the instruction input using an operation unit not shown, and downloads and executes the mobile phone map display application (step ST1). This enables the CPU 26 to function as the mobile phone map display control unit 27 and the navigation processing unit 28.

Next, the mobile phone map display control unit 27 downloads the map data from the mobile phone application server 5 via the communication unit 24, and displays a map on the display screen of the display unit 22 (step ST2). Subsequently, the mobile phone map display control unit 27 instructs the short-range radio communication unit 23 to establish short-range radio communication with the onboard information system 1 (step ST3).

After that, the mobile phone map display control unit 27 displays on the display unit 22 an operation input screen as an HMI (Human Machine Interface) the mobile phone map display application provides, and accepts operation input of the user. As the operation input screen, although various menu screens relating to the navigation processing are conceivable, a scrolling operation using the map display screen as the operation screen is also applicable.

When the operation input is done (step ST4), the mobile phone map display control unit 27 downloads the map data in conformity with the operation from the mobile phone application server 5 via the communication unit 24, and displays the map on the display screen of the display unit 22 (step ST5).

Subsequently, the mobile phone map display control unit 27 transmits, as the information about the map display on the display unit 22, the present position, the map scale and the direction of map display to the onboard information system 1 by the short-range radio communication via the short-range radio communication unit 23 (step ST6).

On the other hand, in the onboard information system 1, the map display control unit 19 reads the map data necessary for the navigation of the vehicle from the HDD 10 in accordance with the instruction of the navigation processing unit 20, and controls the drawing LSI 13 to display the map the map data indicates on the display screen of the liquid crystal monitor 14 (step ST1a). Subsequently, the map display control unit 19 instructs the short-range radio communication unit 9 to establish short-range radio communication with the mobile phone terminal 2 (step ST2a).

The short-range radio communication unit 9 receives the present position of the mobile phone terminal 2, and the map scale and the direction of the map display on the display unit 22, which are transmitted from the mobile phone terminal 2 at the foregoing step ST6. These items of information are supplied from the short-range radio communication unit 9 to the map display control unit 19 (step ST3a). After that, the map display control unit 19 controls the drawing LSI 13 so as to alter the map display center on the screen of the liquid crystal monitor 14, and the direction of map display and the map scale in such a manner that they agree with the present position, the map scale and the direction of map display on the display unit 22, which are supplied from the mobile phone terminal 2 via the short-range radio communication unit 9. Thus, in conformity with the present position of the mobile phone terminal 2, the map scale and the direction of map display of the display unit 22, the drawing LSI 13 alters the map display on the screen of the liquid crystal monitor 14 to the map display with the same direction of the map display and the same present position and direction of movement as those of the mobile phone terminal 2 (step ST4a). Since the screen of the liquid crystal monitor 14 of the onboard information system 1 is greater than the screen of the display unit 22 of the mobile phone terminal 2, this enables the former to display a wider scale map than the latter.

As described above, according to the present embodiment 1, the onboard information system 1 comprises: the short-range radio communication unit 9 for communicating with the mobile phone terminal 2 with a function of displaying a map including its own position; the liquid crystal monitor 14 for executing map display; and the map display control unit 19 for controlling so as to display, in accordance with the information about the map display acquired from the mobile phone terminal 2 via the short-range radio communication unit 9, the map display contents of the mobile phone terminal 2 on the liquid crystal monitor 14 in the same direction as that of the map display of the mobile phone terminal 2. The configuration makes it possible to improve the visibility and operability of the map display processing in the map display executed with the cooperation of the onboard information system 1 and the mobile phone terminal 2.

Incidentally, although the foregoing embodiment 1 shows a case where the onboard information system 1 alters its map display in conformity with the present position, the map scale, and the direction of map display received from the mobile phone terminal 2, the present invention is not limited to that. For example, a configuration is also possible in which the mobile phone terminal 2 alters the map display in conformity with the present position of the vehicle, the map scale and the direction of map display received from the onboard information system 1.

In addition, a configuration is also possible which displays, when a user operates (presses) the present position or registered site on the display screen 14a of the liquid crystal monitor 14 using the touch screen 12 or the like in the onboard information system 1, the indicated present position or registered site on the display unit 22 of the mobile phone terminal 2.

For example, when the present position or registered site displayed on the display screen 14a of the liquid crystal monitor 14 is pressed, the map display control unit 19 transmits the present position or the position of the registered site to the mobile phone terminal 2 by short-range radio communication via the short-range radio communication unit 9 as the information about the map display.

Receiving the present position or the position of the registered site pressed from the onboard information system 1 via the short-range radio communication unit 23, the mobile phone map display control unit 27 displays the present position or registered site on the screen of the display unit 22.

Embodiment 2

The foregoing embodiment 1 shows an example in which both the onboard information system 1 and the mobile phone terminal 2 display the map in the same direction of map display with the same present position and map scale. The present embodiment 2 is configured in such a manner that when the mobile phone terminal alters the direction of map display in accordance with the inclination of the terminal, the onboard information system alters the direction of map display in conformity with that.

Incidentally, although the basic configuration of the navigation system of the embodiment 2 is the same as the configuration of the embodiment 1 shown in FIG. 1, it differs in that the mobile phone terminal alters the direction of map display in accordance with its inclination. Accordingly, as for the configuration other than the mobile phone terminal in the system, we will refer to FIG. 1.

Figure 6:
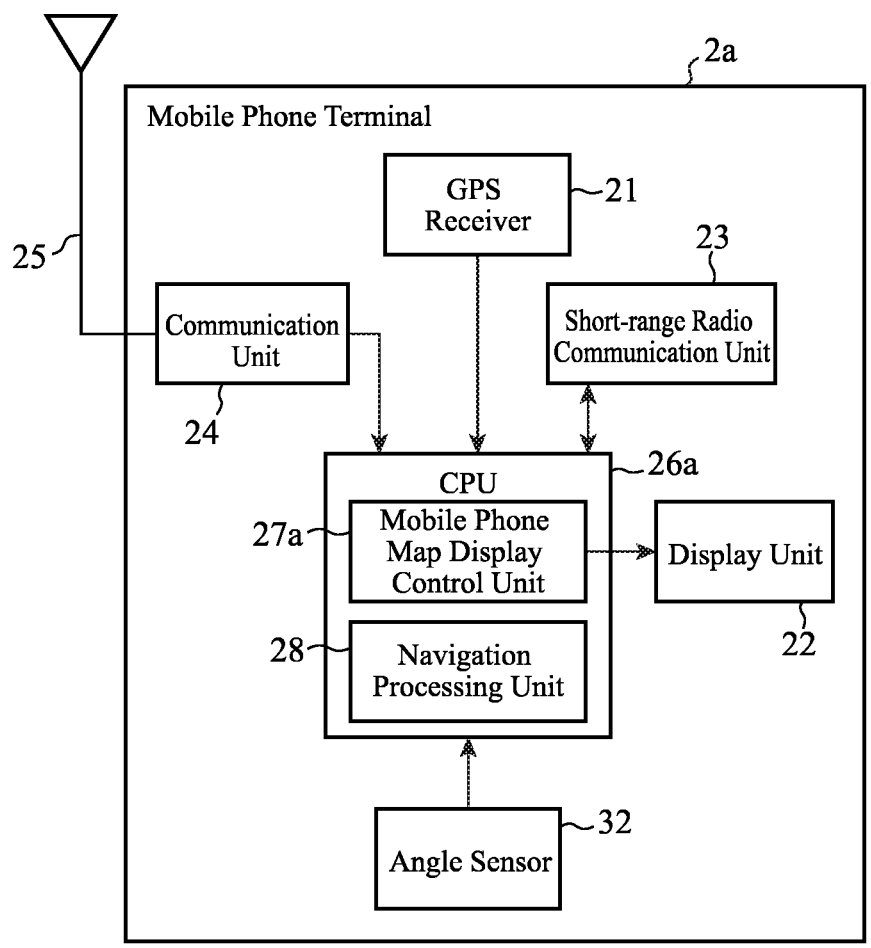
FIG. 6 is a block diagram showing a configuration of a mobile phone terminal of an embodiment 2 in accordance with the present invention.

FIG. 6 is a block diagram showing a configuration of the mobile phone terminal of the embodiment 2 in accordance with the present invention, in which the same components as those of FIG. 1 are designated by the same reference numerals and their description will be omitted. In FIG. 6, the mobile phone terminal 2a, which is a mobile data terminal for executing the navigation processing in cooperation with the onboard information system 1 as in the foregoing embodiment 1, comprises the GPS receiver 21, display unit 22, short-range radio communication unit 23, communication unit 24, antenna 25, a CPU 26a and an angle sensor 32.

The angle sensor 32 is a sensor for detecting the inclination of the mobile data terminal 2a on the same plane as the screen of the display unit 22 of the mobile phone terminal 2a. The CPU 26a, which is a CPU for controlling the individual components in the mobile phone terminal 2a, executes the mobile phone map display application program downloaded from the mobile phone application server 5 to carry out the functions as a mobile phone map display control unit 27a and the navigation processing unit 28. The mobile phone map display control unit 27a, which is a component for controlling the map display using the map data of the mobile phone downloaded from the mobile phone application server 5, executes the map display on the screen of the display unit 22 in accordance with the inclination of the terminal 2a acquired from the angle sensor 32.

Next, the outline of the map display in the embodiment 2 executed with the cooperation of the onboard information system 1 and the mobile phone terminal 2a will be described.

Figure 7:
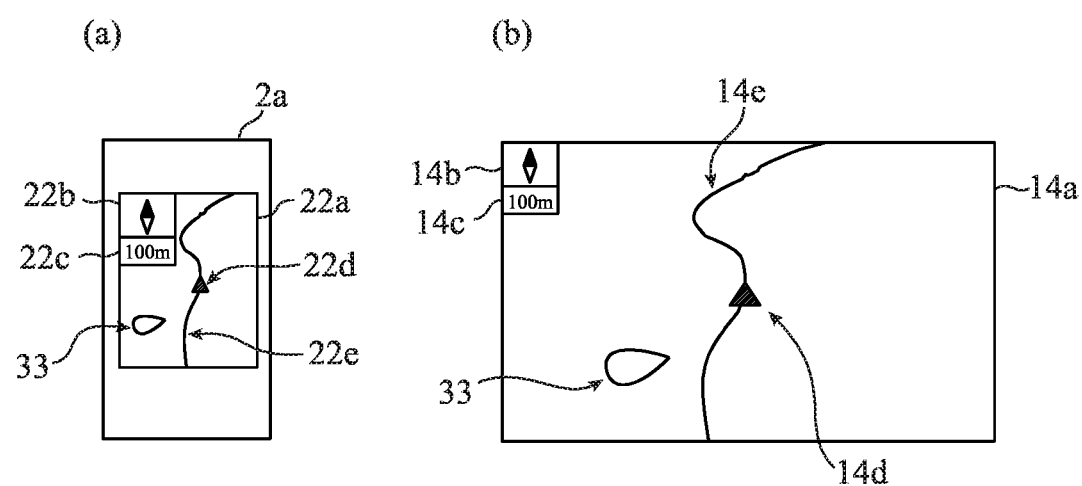
FIG. 7 is a diagram showing a map display screen of the mobile phone terminal with an inclination of zero degree and that of the onboard information system in the navigation system of the embodiment 2.

FIG. 7 is a diagram showing a map display screen of the mobile phone terminal with the inclination of zero degree and that of the onboard information system in the navigation system of the embodiment 2: FIG. 7(*a*) shows the map display of the mobile phone terminal 2a; and FIG. 7(*b*) shows the map display of the onboard information system 1 of the embodiment 2. In addition, it is assumed that the mobile phone terminal 2a is taken into the vehicle with the onboard information system 1 installed therein. Thus the direction of movement of the mobile phone terminal 2a is the same as that of the vehicle where the onboard information system 1 is installed.

In the example shown in FIG. 7(*a*), the display screen 22a of the mobile phone terminal 2a shows the direction indicating section 22b, scale indicating section 22c, symbol 22d indicating the present position, route 22e and a pond 33 close to the route 22e, in which the direction of map display is north up. Here, the mobile phone map display control unit 27a transmits, as the information about the map display of the display unit 22, the present position, the map scale, the direction of map display (north up), and the inclination of the mobile data terminal 2a (zero degree) on the same plane as the display screen 22a to the onboard information system 1 by short-range radio communication via the short-range radio communication unit 23.

The map display control unit 19 of the onboard information system 1 controls the drawing LSI 13 so as to alter the map display center, the direction of map display and the map scale on the screen of the liquid crystal monitor 14 in conformity with the present position received from the mobile phone terminal 2a, the map scale of the map display on the display unit 22, the direction of map display and the inclination of the mobile phone terminal 2a. In accordance with the instruction from the map display control unit 19, the drawing LSI 13 alters the map display on the screen of the liquid crystal monitor 14 in conformity with the present position of the mobile phone terminal 2a, the map scale of the map display on the display unit 22, the direction of map display (north up), and the inclination of the mobile data terminal 2a on the same plane as the display screen 22a. Thus as shown in FIG. 7(*b*), the display screen 14a of the onboard information system 1 shows the direction indicating section 14b, the scale indicating section 14c, the symbol 14d indicating the present position of the vehicle, the route 14e and the pond 33, and executes the map display in the same direction as the mobile phone terminal 2a with the same present position and the same direction of movement.

Figure 8:
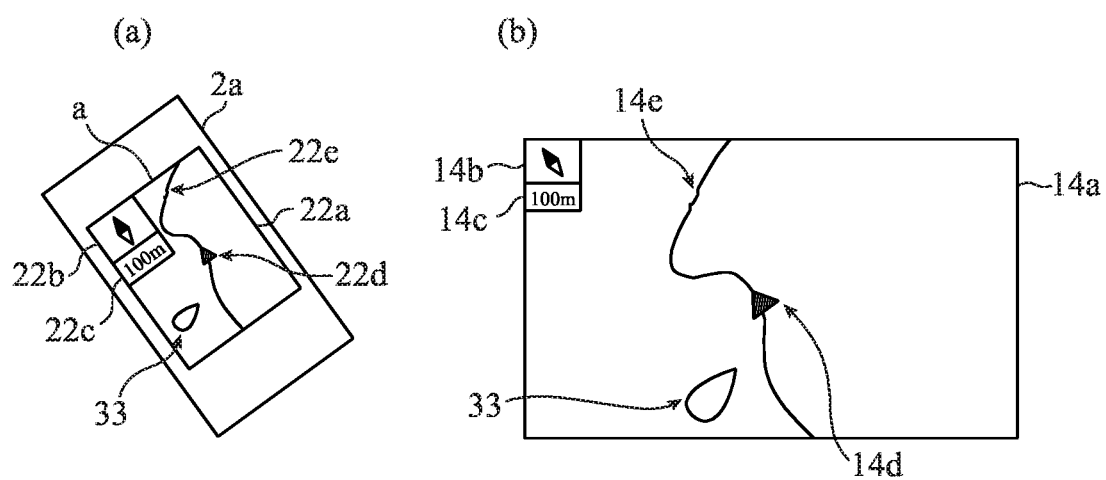
FIG. 8 is a diagram showing a map display screen of the mobile phone terminal with an inclination of 45 degrees and that of the onboard information system in the navigation system of the embodiment 2.

FIG. 8 is a diagram showing a map display screen of the mobile phone terminal with the inclination of 45 degrees and that of the onboard information system in the navigation system of the embodiment 2: FIG. 8(*a*) shows the map display of the mobile phone terminal 2a; and FIG. 8(*b*) shows the map display of the onboard information system 1 of the embodiment 2. The example of FIG. 8(*a*) shows a case where the upper side (side a) of the display screen 22a faces north when the mobile data terminal 2a is inclined 45 degrees on the same plane as the display screen 22a, and executes the map display north up. Here, the mobile phone map display control unit 27a transmits, as the information about the map display of the display unit 22, the present position, the map scale, the direction of map display (north up), and the inclination of the mobile data terminal 2a (45 degrees) on the same plane as the display screen 22a of the mobile phone terminal 2a to the onboard information system 1 by short-range radio communication via the short-range radio communication unit 23.

The map display control unit 19 of the onboard information system 1 controls the drawing LSI 13 so as to alter the map display center, the direction of map display and the map scale on the screen of the liquid crystal monitor 14 in conformity with the present position received from the mobile phone terminal 2a, the map scale of the map display on the display unit 22, the direction of map display and the inclination of the mobile phone terminal 2a. In accordance with the instruction from the map display control unit 19, the drawing LSI 13 alters the map display on the screen of the liquid crystal monitor 14 in conformity with the present position of the mobile phone terminal 2a, the map scale of the map display on the display unit 22, the direction of map display (north up), and the inclination (45 degrees) of the mobile data terminal 2a on the same plane as the display screen 22a.

Here, the display contents of the display screen 22a of the mobile phone terminal 2a with the inclination of 45 degrees are displayed on the screen of the liquid crystal monitor 14 of the onboard information system 1. In other words, as shown in FIG. 8(b), the onboard information system 1 displays the map by rotating it by 45 degrees so as to conform the direction of the map display, the present position, and the direction of movement of the vehicle to those of the mobile phone terminal 2a rather than executing the map display in such a manner that the upper side of the display screen 14a faces north.

Incidentally, since the screen of the liquid crystal monitor 14 of the onboard information system 1 is greater than the screen of the display unit 22 of the mobile phone terminal 2a, it can display the map on a wider scale than the mobile phone terminal 2a.

Figure 9:
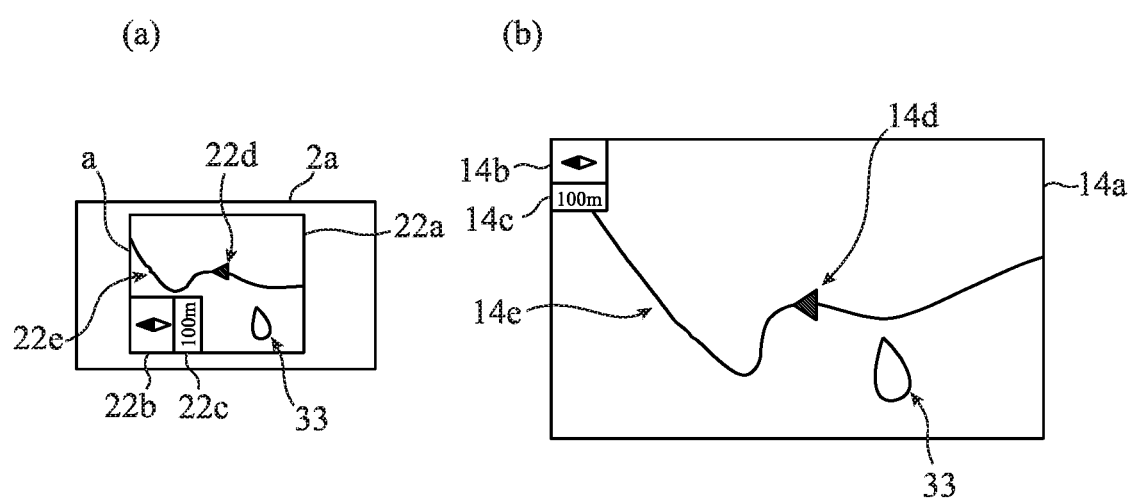
FIG. 9 is a diagram showing a map display screen of the mobile phone terminal with an inclination of 90 degrees and that of the onboard information system in the navigation system of the embodiment 2.

FIG. 9 is a diagram showing a map display screen of the mobile phone terminal with the inclination of 90 degrees and that of the onboard information system in the navigation system of the embodiment 2: FIG. 9(a) shows the map display of the mobile phone terminal 2a; and FIG. 9(b) shows the map display of the onboard information system 1 of the embodiment 2. The example of FIG. 9(a) shows a case where the upper side (side a) of the display screen 22a faces north when the mobile data terminal 2a is inclined 90 degrees on the same plane as the display screen 22a, and executes the map display north up. Here, the mobile phone map display control unit 27a transmits, as the information about the map display of the display unit 22, the present position, the map scale, the direction of map display (north up), and the inclination of the mobile data terminal 2a (90 degrees) to the onboard information system 1 by short-range radio communication via the short-range radio communication unit 23.

The map display control unit 19 of the onboard information system 1 controls the drawing LSI 13 so as to alter the map display center, the direction of map display and the map scale on the screen of the liquid crystal monitor 14 in conformity with the present position received from the mobile phone terminal 2a, the map scale of the map display on the display unit 22, the direction of map display and the inclination of the mobile phone terminal 2a. In accordance with the instruction from the map display control unit 19, the drawing LSI 13 alters the map display on the screen of the liquid crystal monitor 14 in conformity with the present position of the mobile phone terminal 2a, the map scale of the map display on the display unit 22, the direction of map display (north up), and the inclination (90 degrees) of the mobile phone terminal 2a.

Here, the display contents of the display screen 22a when the mobile data terminal 2a is inclined 90 degrees on the same plane as the display screen 22a are displayed on the screen of the liquid crystal monitor 14 of the onboard information system 1. In other words, as shown in FIG. 9(b), the onboard information system 1 displays the map by rotating it by 90 degrees so as to conform the direction of map display, the present position, and the direction of movement of the vehicle to those of the mobile phone terminal 2a rather than executing the map display in such a manner that the upper side of the display screen 14a faces north.

Incidentally, since the screen of the liquid crystal monitor 14 of the onboard information system 1 is greater than the screen of the display unit 22 of the mobile phone terminal 2a, it can display the map on a wider scale than the mobile phone terminal 2a.

When the mobile phone terminal 2a executes the map display in north up so that the upper side (side a) of the display screen 22a always faces north, and if the mobile data terminal 2a is inclined 45 degrees or 90 degrees on the same plane as the display screen 22a, it executes the map display as shown in FIG. 8(a) or FIG. 9(a).

Conventionally, since the mobile phone terminal and the onboard information system do not cooperate as to the direction of map display, when the conventional onboard information system executes the map display in north up, the map display remains as shown in FIG. 7(b) independently of the inclination of the mobile data terminal 2a on the same plane as the display screen 22a of the mobile phone terminal 2a. Accordingly, it is not easy for a user to visually perceive the relationships between the map display of the mobile phone terminal 2a and that of the onboard information system 1.

In contrast with this, in the embodiment 2, the onboard information system 1 receives the information indicating the inclination of the mobile phone terminal 2a, and as shown in FIG. 8(b) and FIG. 9(b), it rotates the map so that it has the same direction of the map display, and the same present position and direction of movement as those of the mobile phone terminal 2a inclined, and displays the map rotated. Inclining the map display by the amount the mobile phone terminal 2a is inclined makes it easier for the user to visually perceive the correspondence between the maps displayed on the onboard information system 1 and the mobile phone terminal 2a, thereby being able to enhance the ease of use.

In addition, depending on the mobile phone map display application the mobile phone terminal 2a executes, there are some applications that execute control in such a manner as to maintain the apparent direction of map display by correcting the inclination when detecting the inclination of the mobile phone terminal. For example, when controlling the display by rotating the map so that the upper side in the vertical direction of the mobile phone terminal 2a always faces north rather than executing the map display in such a manner that the upper side (side a) of the display screen 22a faces north as shown in FIG. 8(a) and FIG. 9(a) when the mobile data terminal 22a is inclined on the same plane as the display screen 22a, the onboard information system 1 does not execute the processing of rotating the map in accordance with the inclination of the mobile phone terminal 2a when it executes the map display with the upper side of the display screen 14a facing north. In this case, the onboard information system 1 acquires a profile concerning the map display of the mobile phone map display application from the mobile phone terminal 2a by short-range radio communication, and decides whether to execute the processing of rotating the map or not in accordance with the method of the map display.

Furthermore, the onboard information system 1 can alter the control method of the map display flexibly in conformity with the map display of the map display application of the mobile phone. For example, when the mobile data terminal 2a is inclined by a prescribed angle on the same plane as the display screen 22a, the onboard information system 1 controls in such a manner as to alter the map display.

As described above, according to the present embodiment 2, the map display control unit 19 controls the direction of the map display on the display screen 14a so as to alter the direction in conformity with the inclination of the mobile phone terminal 2a in accordance with the information about the inclination of the mobile phone terminal 2a on the same plane as the display screen 22a of the mobile phone terminal 2a, which is acquired from the mobile phone terminal 2 via the short-range radio communication unit 9a. Thus, since it alters the map displays of both the devices in conformity with the inclination (direction) of the mobile phone terminal 2a with respect to the horizontal direction, it can improve the visibility and operability of the map display processing.

Embodiment 3

In the embodiment 3, a configuration will be described which alters, when the present position disappears from the display screen of the mobile phone terminal when scrolling a map displayed thereon, the map scale on the display screen of the onboard information system so that both the present position and the end position of the scrolling (cursor position) are displayed. Incidentally, although the basic configuration of the navigation system of the embodiment 3 is the same as the configuration of the embodiment 1 shown in FIG. 1, it differs in that it alters the map scale as mentioned above. Accordingly, as for the system components, we will refer to FIG. 1.

Next, the outline of the map display in the embodiment 3 executed with the cooperation of the onboard information system 1 and the mobile phone terminal 2a will be described.

Figure 10:
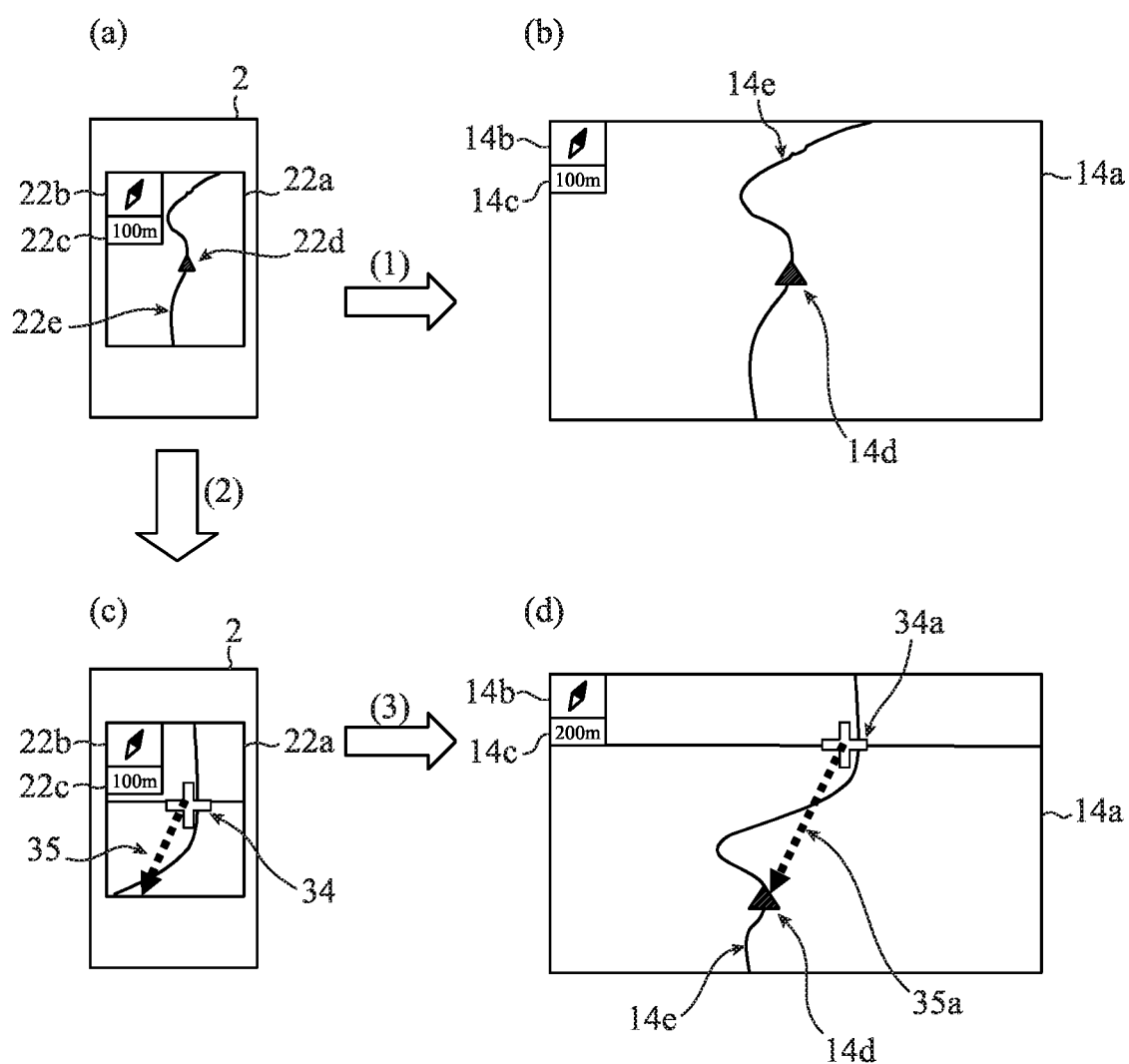
FIG. 10 is a diagram showing a map display screen of the mobile phone terminal and that of the onboard information system in a navigation system of an embodiment 3.

FIG. 10 is a diagram showing a map display screen of the mobile phone terminal 2 and that of the onboard information system 1 in the navigation system of the embodiment 3: FIG. 10(a) shows the map display of the mobile phone terminal 2; FIG. 10(b) shows the map display of the onboard information system 1 of the embodiment 3 conformed to FIG. 10(a). In addition, FIG. 10(c) shows a case of scrolling the map of FIG. 10(a); and FIG. 10(d) shows a map display on the onboard information system 1 when altering the scale in accordance with FIG. 10(c). Incidentally, it is assumed that the mobile phone terminal 2 is taken into the vehicle with the onboard information system 1 installed therein. Thus the direction of movement of the mobile phone terminal 2 is the same as that of the vehicle where the onboard information system 1 is installed.

In the example shown in FIG. 10(a), the display screen 22a of the mobile phone terminal 2 shows the direction indicating section 22b, scale indicating section 22c, symbol 22d indicating the present position, and route 22e, in which as for the direction of map display, the direction of movement of the terminal 2 (the direction of movement of the vehicle) is made the upper side in the map display (heading up). According to the same processing as the foregoing embodiment 1, the onboard information system 1 displays as shown in FIG. 10(b) the direction indicating section 14b, scale indicating section 14c, symbol 14d indicating the present position of the vehicle, and route 14e on the display screen 14a, and the direction of map display is made heading up in cooperation with the mobile phone terminal 2.

In the mobile phone terminal 2, when scrolling of the map shown in FIG. 10(a) advances, the position designated at the arrival point of the scrolling (the position of the cross-shaped scrolling cursor 34: referred to as a "scrolling center" from now on) becomes more distant from the present position, and the present position disappears from the display area of the display screen 22a as shown in FIG. 10(c). Here, an arrow 35 indicating the direction of the present position from the scrolling center can be displayed. For example, according to the displayable scope of the display screen 22a on the present map scale, the mobile phone map display control unit 27 decides on whether the distance from the present position to the scrolling center on the map is within a displayable limit or not, and if it decides that the present position disappears from the display area, it displays the arrow 35 indicating the direction of the present position from the scrolling center. Incidentally, instead of the arrow 35, a straight line or curve connecting the scrolling center to the present position can be displayed.

In addition, when the mobile phone map display control unit 27 decides that the present position disappears from the display area of the display unit 22 by the scrolling operation, it transmits the present position and the position of the scrolling center to the onboard information system 1 by short-range radio communication via the short-range radio communication unit 23 as the information about the map display of the display unit 22.

Receiving the present position and the position of the scrolling center from the mobile phone terminal 2 via the short-range radio communication unit 9, the map display control unit 19 of the onboard information system 1 calculates a map scale enabling display of both the present position and the position of the scrolling center on the display screen of the liquid crystal monitor 14.

For example, it calculates the distance between the present position and the scrolling center from the present position and the position of the scrolling center, and sets the distance between the two at half the vertical length of the display screen of the liquid crystal monitor 14.

Subsequently, the map display control unit 19 sets the scale calculated, and controls the drawing LSI 13 so as to display both the present position and the scrolling center. The drawing LSI 13 alters the map scale on the screen of the liquid crystal monitor 14 in accordance with the instruction from the map display control unit 19, and displays both the present position and the scrolling center on the screen of the liquid crystal monitor 14. Thus, as shown in FIG. 10(d), the symbol 14d indicating the present position and the scrolling cursor 34a corresponding to the position of the scrolling center on the screen of the mobile phone terminal 2 are both displayed on the display screen 14a.

Incidentally, in the same manner as the mobile phone terminal 2, the onboard information system 1 can also display an arrow 35a indicating the direction of the present position from the scrolling center. In addition, instead of the arrow 35a, a straight line or curve connecting the scrolling center to the present position can be displayed.

Throughout the scrolling operation on the mobile phone terminal 2, the onboard information system 1 and the mobile phone terminal 2 execute the foregoing processing continuously. Thus as the scrolling center advances further owing to the scrolling operation on the mobile phone terminal 2, the scale of the map display on the onboard information system 1 increases.

Incidentally, the map display scale on the onboard information system 1 can be altered stepwise.

Furthermore, it is also possible to control the map display in accordance with the direction of the present position to make it easier to catch the position of the scrolling center. For example, a user can set a shape other than the cross as the shape of the cursor 34 indicating the position of the scrolling center.

As described above, according to the present embodiment 3, it comprises: the short-range radio communication unit 9 for communicating with the mobile phone terminal 2 with a function of displaying a map including its own position; the liquid crystal monitor 14 for executing map display; and the map display control unit 19 for controlling in such a manner as to display the map display contents of the mobile phone terminal 2 by adjusting the map scale so as to enable the prescribed spots on the map to be displayed on the liquid crystal monitor 14 in accordance with the information about the map display acquired from the mobile phone terminal 2 via the short-range radio communication unit 9. In particular, the map display control unit 19 adjusts the map scale so as to enable displaying both the present position of the mobile phone terminal 2 acquired via the short-range radio communication unit 9 and the designated position (scrolling center) indicated by the scrolling operation of the map displayed on the mobile phone terminal 2, and controls in such a manner that the present position and the designated position are included in the map display contents of the mobile phone terminal 2 displayed on the liquid crystal monitor 14.

This makes it possible to improve the visibility and operability of the map scrolling operation.

Incidentally, although the foregoing embodiment 3 shows a case where the onboard information system 1 alters its map display in accordance with the scrolling operation executed on the mobile phone terminal 2, a configuration is also possible in which the mobile phone terminal 2 alters its map display in accordance with the scrolling operation executed on the onboard information system 1.

For example, when moving the map display on the liquid crystal monitor 14 in accordance with the scrolling operation, the map display control unit 19 transmits the present position and the position of the scrolling center to the mobile phone terminal 2 by the short-range radio communication via the short-range radio communication unit 9 as the information about the map display.

Receiving the present position and the position of the scrolling center from the onboard information system 1 via the short-range radio communication unit 23, the mobile phone map display control unit 27 calculates the map scale enabling displaying both the present position and the position of the scrolling center on the display screen of the display unit 22. For example, it calculates the distance between the present position and the scrolling center from the present position and the position of the scrolling center, and sets the distance between the two at half the vertical length of the display screen of the display unit 22.

Subsequently, the mobile phone map display control unit 27 sets the scale calculated, and displays both the present position and the scrolling center on the screen of the display unit 22.

Recently, a mobile data terminal with a screen greater than that of a common onboard information system 1 has been spreading. Such a mobile data terminal can improve the visibility and operability of the scrolling operation of the map by executing the map display in cooperation with the onboard information system 1 as described above. Incidentally, it is also possible without altering the map scale to employ the map area moved by the scrolling operation on the onboard information system 1 as the map area to be displayed on the display screen 22a of the mobile phone terminal 2.

In addition, a configuration is also possible which transmits an operation signal to the mobile phone terminal 2 by pressing a current position display button (not shown) on the onboard information system 1 side so that the mobile phone terminal 2 can display the present spot instantly. This makes it possible to control the mobile phone terminal 2 at the onboard system side where the user interface is easy to use, thereby being able to improving the operability of the mobile phone terminal 2. Such control makes the latest operation effective between the mobile data terminal 2 and the onboard information system 1, thereby enabling controlling the other side.

Embodiment 4

In the embodiment 4, a configuration will be described which alters, when part of the route from the present position to the destination that is searched for by the mobile phone terminal, disappears from the display screen, the map scale on the display screen of the onboard information system so that the entire route from the present position to the destination is displayed on the display screen of the onboard information system. Incidentally, although the basic configuration of the navigation system of the embodiment 4 is the same as the configuration of the embodiment 1 shown in FIG. 1, it differs in that it alters the map scale as mentioned above. Accordingly, as for the system components, we will refer to FIG. 1.

Next, the outline of the map display in the embodiment 4 executed with the cooperation of the onboard information system 1 and the mobile phone terminal 2 will be described.

Figure 11:
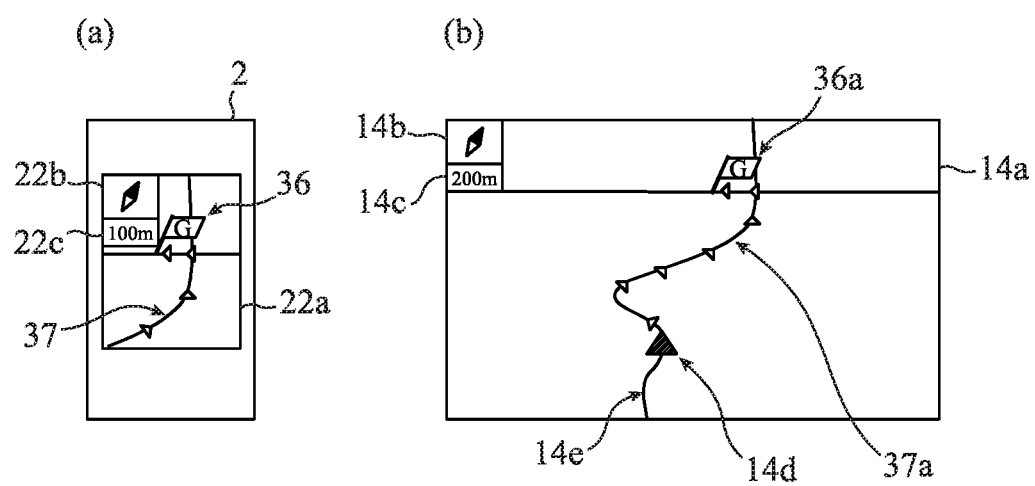
FIG. 11 is a diagram showing a map display screen of the mobile phone terminal and that of the onboard information system in a navigation system of an embodiment 4.

FIG. 11 is a diagram showing a map display screen of the mobile phone terminal and that of the onboard information system in the navigation system of the embodiment 4: FIG. 11(*a*) shows the map display of the mobile phone terminal 2; FIG. 11(*b*) shows the map display of the onboard information system 1 of the embodiment 4 conformed to FIG. 11(*a*). Incidentally, it is assumed that the mobile phone terminal 2 is taken into the vehicle with the onboard information system 1 installed therein. Thus the direction of movement of the mobile phone terminal 2 is the same as that of the vehicle where the onboard information system 1 is installed.

In the example shown in FIG. 11(*a*), the display screen 22a of the mobile phone terminal 2 shows the direction indicating section 22b, scale indicating section 22c, symbol 22d indicating the present position, and route 22e, in which as for the direction of map display, the direction of movement of the terminal 2 (the direction of movement of the vehicle) is made the upper side in the map display (heading up). In addition, the navigation processing unit 28 of the mobile phone terminal 2 searches for the route from the present position to the destination, and the mobile phone map display control unit 27 causes the display screen 22a to display a route 37 as a result of the search.

Since the display screen 22a of the mobile phone terminal 2 is small, depending on the length of the route 37 from the present position to the destination 36, there are some cases where the entire route is not displayed as shown in FIG. 11(*a*). In view of this, the onboard information system 1 of the embodiment 4 alters the map scale and executes the map display so that the entire route 37 searched for by the mobile phone terminal 2 is display as shown in FIG. 11(*b*). For example, according to the displayable scope of the display screen 22a on the present map scale, the mobile phone map display control unit 27 decides on whether the entire route 37 acquired as a result of the search can be displayed or not, and if it decides that part of the route 37 disappears from the display area, it transmits the present position and the information indicating the position of and route to the destination 36 to the onboard information system 1 by short-range radio communication via the short-range radio communication unit 23 as the information about the map display of the display unit 22.

Receiving the present position and the information indicating the position of and route to the destination 36 from the mobile phone terminal 2 via the short-range radio communication unit 9, the map display control unit 19 of the onboard information system 1 calculates a map scale enabling display of the entire route 37 including the present position and destination 36 on the display screen of the liquid crystal monitor 14. For example, it decides the map scale of the onboard information system 1 according to the ratio between the size of the display screen 14a of the onboard information system 1 and the size of the display screen 22a of the mobile phone terminal 2. Incidentally, to display the entire route 37, the onboard information system 1 has the map scale greater than the map scale of the display unit 22 of the mobile phone terminal 2.

For example, when it is assumed that the length measurement of the display screen 22a of the mobile phone terminal 2 is $L_t$ and the length measurement of the display screen 14a of the liquid crystal monitor 14 of the onboard information system 1 is $L_E$, a display scale is obtained which reduces a circumscribed quadrilateral of the route 37 by the map reduction ratio $L_t/L_E$. Alternatively, when it is assumed that the width measurement of the display screen 22a of the mobile phone terminal 2 is $W_t$ and the width measurement of the display screen 14a of the liquid crystal monitor 14 of the onboard information system 1 is $W_E$, it is also possible to obtain a display scale that reduces the circumscribed quadrilateral of the route 37 by the map reduction ratio $W_t/W_E$. Furthermore, as for the map reduction ratio $L_t/L_E$ or $W_t/W_E$, it can be adjusted by multiplying it by a prescribed constant α or by adding a prescribed constant β to it. Alternatively, $((W_t \cdot L_t)/(W_E \cdot L_E))^{1/2}$ can be used as the map reduction ratio.

Next, the map display control unit 19 sets the scale calculated, and controls the drawing LSI 13 in such a manner as to display the entire route 37 including the present position and the destination 36. Altering the map scale of the screen of the liquid crystal monitor 14 in accordance with the instruction from the map display control unit 19, the drawing LSI 13 displays on the display screen 14a the route 37a corresponding to the route 37 which is searched for by the mobile phone terminal 2 and includes the symbol 14d representing the present position and the destination 36a corresponding to the position of the destination 36 on the screen of the mobile phone terminal 2 as shown in FIG. 11(b).

In addition, as the information about the route searched for by the mobile phone terminal 2, POI information around the route acquired from the mobile phone map DB can also be included. For example, the mobile phone terminal 2 transmits the POI information around the route 37 to the onboard information system 1, and the onboard information system 1 displays the POI information it receives from the mobile phone terminal 2 around the route 37a.

The map reduction ratio can be obtained as follows.

Figure 12:
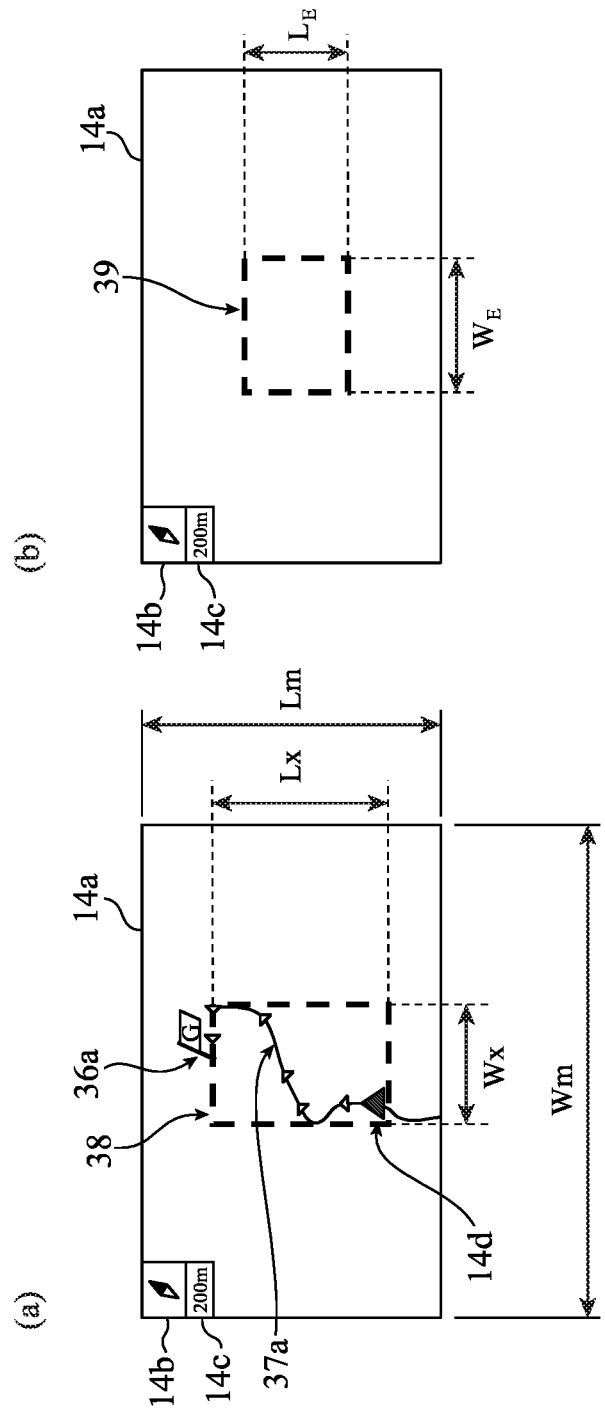
FIG. 12 is a diagram illustrating a calculation method of the map reduction ratio of an onboard information system.

FIG. 12 is a diagram illustrating a calculation method of the map reduction ratio of the onboard information system. As shown in FIG. 12(a), it is assumed that the length measurement of the display screen 14a of the liquid crystal monitor 14 of the onboard information system 1 is Lm, the width measurement thereof is Wm, the route 37a from the present position 14d to the destination 36a, the whole of which is to be displayed, is a curve L, the length measurement of a circumscribed quadrilateral 38 of the curve L is Lx, and the width measurement thereof is Wx. In the case where the map in the circumscribed quadrilateral 38 is reduced and displayed in the area 39 shown in FIG. 12(b), where the length measurement of the area 39 is $L_E$ and the width measurement thereof is $W_E$, the aspect ratio $S_A$ of the area 39 is given by $S_A = L_E/W_E$. Making use of them, the map reduction ratio MIN (SL, SW) for displaying the whole route 37a is calculated according to the following expressions.

$$SL = (Lm/Lx) \times S_A$$

$$Sw = (Wm/Wx) \times S_A$$

$$\mathrm{MIN}(SL, SW) = \mathrm{MIN}((Lm/Lx), (Wm/Wx)) \times S_A$$

In addition, the map reduction ratio can be calculated by the following expressions.

$$Sx = \mathrm{MAX}(Lx, Wx)$$

$$Sm = \mathrm{MAX}(Lm, Wm)$$

$$\text{map reduction ratio} = (Sx/Sm) \times S_A$$

As described above, according to the present embodiment 4, the map display control unit 19 carries out its control in such a manner as to display on the liquid crystal monitor 14 the map display contents of the mobile phone terminal 2 including the present position and destination by adjusting the map scale to the scale that enables displaying both the present position of the mobile phone terminal 2 and the destination position acquired via the short-range radio communication unit 9. This makes it possible to improve the visibility of the route searched for by the mobile phone terminal 2 and the operability of handling the route obtained as a result of the search.

In addition, although the foregoing embodiment 4 shows the case where the onboard information system 1 displays the map obtained as a result of the route search executed by the mobile phone terminal 2, a configuration is also possible which transmits the present position and the destination position to the onboard information system 1 before the route search and displays the map on the liquid crystal monitor 14 on a map scale capable of displaying both the present position and the destination.

For example, the mobile phone map display control unit 27 transmits the present position and the position of the destination 36 to the onboard information system 1 by short-range radio communication via the short-range radio communication unit 23.

Receiving the present position and the position of the destination 36 from the mobile phone terminal 2 via the short-range radio communication unit 9, the map display control unit 19 of the onboard information system 1 calculates the map scale capable of displaying the present position and the destination 36 on the display screen of the liquid crystal monitor 14.

Next, the map display control unit 19 sets the scale calculated, and controls the drawing LSI 13 in such a manner as to display the present position and the destination 36. Altering the map scale of the screen of the liquid crystal monitor 14 in accordance with the instruction from the map display control unit 19, the drawing LSI 13 displays on the display screen 14a the symbol 14d representing the present position and the destination 36a corresponding to the position of the destination 36 on the screen of the mobile phone terminal 2. Incidentally, instead of the destination, the liquid crystal monitor 14 can display any map display position designated by the operation to the mobile phone terminal 2 together with the present position on a scale that will enable displaying both of them.

In addition, in accordance with the positional relationships between the present position and the display on the mobile phone terminal 2, the scale can be adjusted so that they are displayed at predetermined positions on the liquid crystal monitor 14 of the onboard information system 1. For example, when the present position is above the position displayed on the mobile phone terminal 2 in the heading up mode, the scale can be adjusted in such a manner that the present position comes to a point at ⅕ distance between the top and bottom of the display screen of the liquid crystal monitor 14 from the top, and the position displayed on the mobile phone terminal 2 comes to a point at ⅘ distance. When the present position is below the position displayed on the mobile phone terminal 2, the scale can be adjusted in such a manner that the present position comes to a point at ⅘ distance between the top and bottom of the display screen of the liquid crystal monitor 14 and the position displayed on the mobile phone terminal 2 comes to a point at ⅕ distance. The display method can be applied to the right and left positional relationships between the present position and the position displayed on the mobile phone terminal 2.

Furthermore, although the foregoing embodiment 4 shows a case where the result of the route search executed by the mobile phone terminal 2 is displayed on the onboard information system 1 as a map, it is also possible to display a result of the route search executed by the onboard information system 1 on the mobile phone terminal 2 as a map.

For example, when the navigation processing unit 20 executes the route search, the map display control unit 19 transmits the information indicating the present position, the position of the destination and the route to the mobile phone terminal 2 by the short-range radio communication via the short-range radio communication unit 9 as the information about the map display.

Receiving the information indicating the present position, the position of the destination and the route from the onboard information system 1 via the short-range radio communication unit 23, the mobile phone map display control unit 27 calculates the map scale that enables display of the whole route including the present position and the destination on the display screen of the liquid crystal monitor 14.

Subsequently, the mobile phone map display control unit 27 sets the scale calculated in the display unit 22, and displays the route including the present position and destination on the screen of the display unit 22.

The cooperation as to the route as described above makes it possible to improve visibility and operability in the navigation processing. Incidentally, the route searched for by the onboard information system 1 can be displayed on the display screen 22a of the mobile phone terminal 2 without altering the map scale.

In addition, the information about the route searched for by the onboard information system 1 can include the POI information around the route acquired from the map DB. For example, the onboard information system 1 transmits the POI information around the route to the mobile phone terminal 2, and the mobile phone terminal 2 displays the POI information it receives from the onboard information system 1 around the route.

Furthermore, a configuration is also possible in which both the onboard information system 1 and mobile phone terminal 2 execute the route search, and if the routes obtained as a result of the search differ from each other, it can give priority to one of them.

For example, when the navigation processing unit 20 of the onboard information system 1 executes the route search, it transmits the present position, destination and information necessary for the route search such as search conditions a user sets to the mobile phone terminal 2 by the short-range radio communication via the short-range radio communication unit 9.

Receiving the present position, destination and information necessary for the route search such as search conditions the user sets from the onboard information system 1 via the short-range radio communication unit 23, the navigation processing unit 28 of the mobile phone terminal 2 searches for a route using the information. Then the navigation processing unit 28 transmits the route search result, which the navigation processing unit 28 searches for, to the onboard information system 1 by short-range radio communication via the short-range radio communication unit 23.

The map display control unit 19 of the onboard information system 1 compares the route search result of the navigation processing unit 20 with the route search result of the mobile phone terminal 2 received via the short-range radio communication unit 9, and selects one of the routes when they differ.

For example, between the two route search results of the onboard information system 1 and the mobile phone terminal 2, it selects one that uses for the route search the map data with the newer creation date preferentially, and both the onboard information system 1 and the mobile phone terminal 2 display the route selected.

Alternatively, between the two route search results of the onboard information system 1 and the mobile phone terminal 2, it can select one that uses for the route search the map data with newer version information corresponding to the creation date.

Furthermore, between the two route search results of the onboard information system 1 and the mobile phone terminal 2, it can select one that uses for the route search the map data with newer update date.

Incidentally, compared with the map data of the onboard information system 1 that retains the map data fixedly in an HDD or the like, it is more likely that the map data of the mobile phone map DB are updated to the latest information. Accordingly, when the creation date of the map data is uncertain, the route search result of the mobile phone terminal 2 can be selected.

Although the foregoing embodiments 1-4 show a case that employs the mobile phone terminal 2 or 2a as the mobile data terminal, the present invention is not limited to that. For example, a PDA (Personal Digital Assistance) can be used as the mobile data terminal for executing the map display in cooperation with the onboard information system 1, or a portable personal computer can be used.

In addition, although the foregoing embodiments 1-4 show a case that employs the onboard information system 1 as the navigation apparatus, the present invention is not limited to that. For example, a PDA can be used as the navigation apparatus for executing the map display in cooperation with the mobile phone terminal 2 or 2a, or a portable personal computer can be used.

Incidentally, it is to be understood that a free combination of the individual embodiments, variations of any components of the individual embodiments or removal of any components of the individual embodiments are possible within the scope of the present invention.

INDUSTRIAL APPLICABILITY

A navigation apparatus in accordance with the present invention can improve the visibility and operability in the map display processing, in the setting of a destination on a map, in the confirmation of the present position and in the scrolling of a map. Accordingly, it is suitable for an onboard navigation apparatus.

What is claimed is:
1. A navigation apparatus comprising:
a communication device to communicate with a mobile data terminal that has a function of displaying a map including a position of the mobile data terminal; and
a processor to control a display so as to display a map in a same direction as a direction of map display on the mobile data terminal, using a map database for the navigation apparatus that is different from a map database for the mobile data terminal, on a basis of information about the map display acquired from the mobile data terminal via the communication device wherein the processor controls alteration of the direction of the map display on the display in conformity with an inclination of the mobile data terminal with respect to a predetermined axis.
2. The navigation apparatus according to claim 1, wherein the processor controls the alteration of the direction of the map display on the display in conformity with the inclination of the mobile data terminal on a basis of information that indicates the inclination of the mobile data terminal on a same plane as a display surface of the mobile data terminal and that is acquired from the mobile data terminal via the communication device.

3. The navigation apparatus according to claim 1, wherein the processor, when a route search result of the mobile data terminal acquired via the communication device differs from a route search result of the navigation apparatus, selects the route search result obtained using newer map data, and controls the display so as to display the result selected.

4. A navigation apparatus comprising:
a communication device to communicate with a mobile data terminal that has a function of displaying a map including a position of the mobile data terminal; and
a processor to control a display so as to display the map by adjusting a map scale to a scale that enables the display of the navigation apparatus to display prescribed spots on the map on a basis of information about the map display acquired from the mobile data terminal via the communication device.

5. The navigation apparatus according to claim 4, wherein the processor controls the display by adjusting the map scale to a scale that enables displaying both a present position of the mobile data terminal and a designated position on the map the mobile data terminal displays, both of which are acquired via the communication device, so that the display displays a map including both the present position and the designated position.

6. The navigation apparatus according to claim 5, wherein the processor controls the display so as to display the present position and the designated position in prescribed symbols and to display a straight line or curve connecting between the present position and the designated position.

7. The navigation apparatus according to claim 4, wherein the processor controls the display by adjusting the map scale to a scale that enables displaying both a present position of the mobile data terminal and a designated position specified by scrolling the map the mobile data terminal displays, both of which are acquired via the communication device, so that the display displays a map including both the present position and the designated position.

8. The navigation apparatus according to claim 4, wherein the processor controls the display by adjusting the map scale to a scale that enables displaying both a present position of the mobile data terminal and a destination, both of which are acquired via the communication device, so that the display displays a map including both the present position and the destination.

9. The navigation apparatus according to claim 4, wherein the processor controls the display by adjusting, on a basis of a present position and a destination of the mobile data terminal and a search result of a route from the present position to the destination, the present position, the destination and the route being acquired via the communication device, the map scale to a scale that enables displaying the route from the present position to the destination, so that the display displays a map including the route.

10. The navigation apparatus according to claim 4, wherein the processor adjusts the map scale on a basis of a ratio between a size of a display screen of the mobile data terminal and a size of a display screen of the display.

11. The navigation apparatus according to claim 4, wherein the processor controls the display so as to display the map on a map scale greater than a map scale of the mobile data terminal.

12. The navigation apparatus according to claim 4, wherein the processor controls the display so as to display a map in a same direction as a direction of map display on the mobile data terminal on a basis of information about the map display acquired from the mobile data terminal via the communication device.

13. A mobile data terminal comprising:
a communication device to communicate with a navigation apparatus that stores a navigation apparatus map database and with a mobile terminal application server that stores a mobile terminal map database;
a display for executing map display; and
a processor to control the display of the mobile data terminal so as to display a map in a same direction as a direction of map display on the navigation apparatus using map data downloaded from the mobile terminal application server on a basis of information about the map display acquired from the navigation apparatus via the communication device.

14. The mobile data terminal according to claim 13, wherein
the processor controls the display so as to display the map by adjusting a map scale to a scale that enables the display to display prescribed spots on the map on a basis of the information about the map display acquired from the navigation apparatus via the communication device.

15. The mobile data terminal according to claim 14, wherein
the processor controls the display by adjusting the map scale to a scale that enables displaying both a present position of the navigation apparatus and a designated position on the map the navigation apparatus displays, both of which are acquired via the communication device, so that the display displays a map including both the present position and the designated position.

16. The mobile data terminal according to claim 14, wherein
the processor controls the display by adjusting the map scale to a scale that enables displaying both a present position of the navigation apparatus and a designated position specified by scrolling the map the navigation apparatus displays, both of which are acquired via the communication device, so that the display displays a map including both the present position and the designated position.

17. The mobile data terminal according to claim 14, wherein
the processor controls the display by adjusting the map scale to a scale that enables displaying both a present position of the navigation apparatus and a destination, both of which are acquired via the communication device, so that the display displays a map including both the present position and the destination.

18. The mobile data terminal according to claim 17, wherein
the processor controls the display by adjusting, on a basis of the present position and the destination of the navigation apparatus and a search result of a route from the present position to the destination, the present position, the destination and the route being acquired via the communication device, the map scale to a scale that enables displaying the route from the present position to the destination, so that the display displays a map including the route.

* * * * *